United States Patent [19]

Creed

[11] Patent Number: 4,495,501
[45] Date of Patent: Jan. 22, 1985

[54] METHOD AND MEANS FOR PROVIDING FREQUENCY AGILE OPERATION OF MTI RADAR

[75] Inventor: Durwood L. Creed, Rome, N.Y.

[73] Assignee: The United States of America as represented by the Secretary of the Air Force, Washington, D.C.

[21] Appl. No.: 373,084

[22] Filed: Apr. 28, 1982

[51] Int. Cl.³ ............... G01S 13/52; G01S 13/24
[52] U.S. Cl. ............................ 343/7.7; 343/17.2 R
[58] Field of Search .................... 343/7.7, 17.2 R

[56] References Cited

U.S. PATENT DOCUMENTS

| | | | |
|---|---|---|---|
| 3,403,394 | 9/1968 | Rouault | 343/5 |
| 4,023,169 | 5/1977 | Kolp et al. | 343/17.2 R |
| 4,038,659 | 7/1977 | Hamer et al. | 343/17.1 R |
| 4,071,844 | 1/1978 | Hopwood | 343/17.2 R |
| 4,153,899 | 5/1979 | Taylor, Jr. | 343/7.7 |
| 4,155,088 | 5/1979 | Taylor et al. | 343/7.7 |
| 4,206,463 | 6/1980 | Glasgow | 343/17.2 R |
| 4,361,840 | 11/1982 | Hauptmann | 343/7.7 |
| 4,385,298 | 5/1983 | Josefsson et al. | 343/17.2 R X |

Primary Examiner—T. H. Tubbesing
Attorney, Agent, or Firm—Donald J. Singer; William C. Auton

[57] ABSTRACT

The obtaining of simultaneous pulse-to-pulse transmitter carrier frequency agility and compatible moving target indicator (MTI) operation in conventional surveillance radars is achieved by the use of pairs of frequencies with a controlled relationship between the frequencies of each pair. A set of four pulses with different frequencies is sequentially transmitted and form two pairs of pulses. The difference between the frequencies of one pair of pulses is made equal to the difference between the frequencies of the second pair of pulses. MTI operation is obtained by differencing the pairs. Pulses having any three frequencies may be selected in any sequence before a constraint is imposed. The frequency of the fourth pulse is then determined by the frequencies of the first three pulses.

6 Claims, 2 Drawing Figures

METHOD AND MEANS FOR PROVIDING FREQUENCY AGILE OPERATION OF MTI RADAR

STATEMENT OF GOVERNMENT INTEREST

The invention described herein may be manufactured and used by or for the Government for governmental purposes without the payment of any royalty thereon.

BACKGROUND OF THE INVENTION

This invention relates to radar systems and in particular to MTI radars and to a method and means for providing frequency agile operation of MTI radars.

MTI radars are well known in the art and are described in many publications such as M. J. Skolnik's *Introduction to Radar Systems*, chapter 4, pp 113-163, published by McGraw-Hill, 1962.

Frequency agile radars are also well known in the art and descriptions and operating principles of such systems are equally well documented. For example, U.S. Pat. No. 4,071,844 entitled *Frequency Control for Frequency Agile Pulse Radar*, F. W. Hopwood et al, and U.S. Pat. No. 4,023,169 entitled *Automatic Frequency Control Circuit for Frequency Agile Radar*, E. J. Kolp et al are typical of such publications.

Conventional radar design concepts and practices allow a radar to either change transmitted frequency on a pulse to pulse basis or to obtain moving target indicator (MTI) ground clutter cancellation operation. The latter requires a series of fixed frequency pulses and thus frequency agility and MTI are generally assumed to be fundamentally incompatible. This incompatibility presents a fundamental problem in the design of radars with intrinsically good electronic countercountermeasure (ECCM) performance. A good ECCM radar must have good rejection of both noise jamming and of radar chaff. Frequency agility is a basic and powerful technique for obtaining noise jammer rejection. Good chaff rejection, on the other hand, requires good MTI performance.

To date there has been no satisfactory solution to reconcile the incompatible aspects of the two types of radar systems. Accordingly, there currently exists the need for a technique that will permit frequency agile operation of an MTI radar. The present invention is directed toward satisfying that need.

SUMMARY OF THE INVENTION

The present invention comprehends a method and means for providing for frequency agile operation of an MTI radar. The technique employed to accomplish this entails generating and transmitting a pulse train in which each pulse of each successive set of four pulses of the pulse train has a different frequency. The frequency of one pulse in the set of four pulses is related to the frequencies of the other three pulses such that the frequency difference between the first and second pulses is equal to the frequency difference between the third and fourth pulses. The received r.f. pulse train echo is processed in successive sets of four pulses by: differencing the second pulse and the first pulse delayed by a time increment $\Delta T$ to provide a difference pulse signal; differencing the fourth pulse and the third pulse delayed a time increment $\Delta T$ to provide a second difference pulse signal; and differencing the second difference pulse signal and the first difference pulse signal delayed a time increment $2\Delta T$ to provide the MTI output.

The apparatus of the invention comprises an MTI radar in which the transmitted pulses are modulated as indicated by frequency agile radar techniques. Processing of received echo pulses is accomplished by a linear combiner circuit that differences the pulse pair difference signals.

It is a principal object of the invention to provide a new and improved MTI radar.

It is another object of the invention to provide an MTI radar having a frequency agile mode of operation.

It is another object of the invention to provide a frequency agile MTI radar in which pulse to pulse frequency changes appear to hostile radar to be random.

It is another object of the invention to provide a new and improved ECCM surveillance radar.

These together with other objects, features and advantages of the invention will become more readily apparent from the following detailed description when taken in conjunction with the illustrative embodiment in the accompanying drawing.

DETAILED DESCRIPTION OF THE PREFERRED EMBODIMENT

Figure 1:
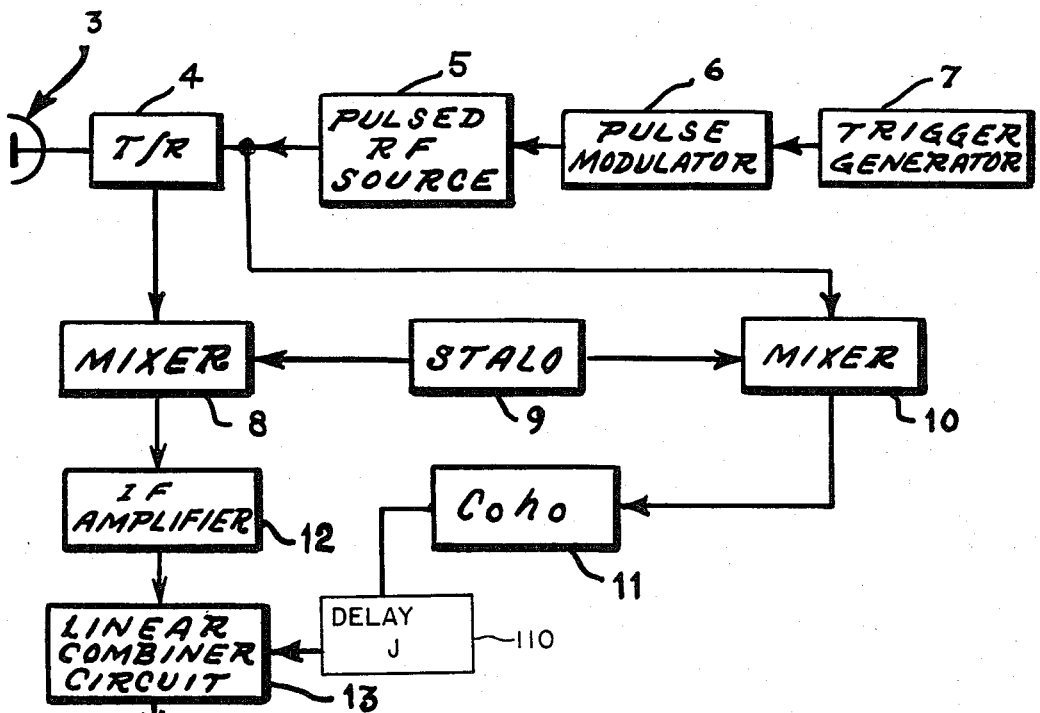
FIG. 1 is a block diagram of an MTI radar modified in accordance with the principles of the invention.

This invention provides for improved ECCM and comprises an improved mode of MTI radar operation and electronic circuitry for implementing that mode of operation. The invention is capable of obtaining simultaneous pulse to pulse transmitter carrier frequency agility and compatible moving target indicator (MTI) operation in a conventional volumetric surveillance type radar. The concept may be initially described as frequency pair MTI since it uses pairs of frequencies with a controlled relationship between them. Conventional MTI operates by deriving the total round trip phase difference between the radiated signal to a fixed range target and the intervening phase progression of one or more stable oscillators used to derive the transmitted carrier. To a given target at any fixed range this progression is always the same provided the same transmitted frequency is always compared to the same oscillator frequencies. It has been noted above in background discussion that if two different carrier frequencies are used on two successive pulses to the same fixed range target, the total round trip phase excursions will, in general, be different and conventional MTI circuitry will not function to "cancel" the fixed range target. There will, however, be a particular measurable difference in the round trip phase excursion to the fixed range target and this difference will be determined by the actual difference in carrier frequency between the two successively radiated signals. It is a basic concept of the invention as will be hereinafter demonstrated that for a point target at any fixed range the same difference in round trip phase excursion will be produced by all values of frequency pairs which have the same value of difference frequency. Thus a set of four frequencies may be transmitted in sequence and if they are so chosen that they form two pairs of frequencies with equal difference frequencies then MTI operation against fixed targets may be obtained.

The basic theory upon which the invention is founded is developed as follows:

Let $\delta\phi = \omega t$ be the phase progression of a stable sinusodial oscillator running at frequency $\omega$ for time t.

let $t_R$ = the round trip transit time to a radar target at fixed range R then $t_R = 2R/C$ where C = the speed of light.

Therefore the phase progression of an oscillator at frequency $\omega$ which occurs during the round trip transit time to range R of a radar pulse at frequency $\omega$ is:

$$\delta\phi = t_R = 2R/C\omega \quad (1)$$

Now let this operation be repeated with a sequence of four pulses of frequencies $\omega_1, \omega_2, \omega_3, \omega_4$.

The resulting phase excursions are:

$$\delta\phi_1 = 2R/C \, \omega_1 \quad (2)$$
$$\delta\phi_2 = 2R/C \, \omega_2 \quad (3)$$
$$\delta\phi_3 = 2R/C \, \omega_3 \quad (4)$$
$$\delta\phi_4 = 2R/C \, \omega_4 \quad (5)$$

Now let the difference in phase excursion be derived separately for $\delta\phi_2 - \delta\phi_1$ and $\delta\phi_4 - \delta\phi_3$.

$$\delta\phi_2 - \delta\phi_1 = 2R/C \, (\omega_2 - \omega_1) \quad (6)$$

This represents the difference in phase excursion to range R of pulses number 1 and 2 due to their difference frequencies $\omega_1$ and $\omega_2$. Similarly, the difference in phase excursion between pulse numbers 3 and 4 is:

$$\delta\phi_4 - \delta\phi_3 = 2R/C \, (\omega_4 - \omega_3) \quad (7)$$

Now, if the net difference in phase excursion between pulse pair one (pulse 2 minus pulse 1) can be made equal to that between pulse pair two (pulse 4 minus pulse 3), the two resulting signals will be identical and can be used in a subtractor circuit to cancel the target return at range R. An examination of equations (6) and (7) shows that they will be equal if the *difference* between the two frequency pairs is made equal.

That is, if $$\omega_2 - \omega_1 = \omega_4 - \omega_3 \quad (8)$$

then $$\delta\phi_2 - \delta\phi_1 = \delta\phi_4 - \delta\phi_3 \quad (9)$$

Equation (8) represents the heart of the Frequency Agile MTI design. This indicates that, in principle, any three frequencies may be sequentially selected before a constraint is imposed. The fourth frequency is then uniquely determined by the first three. However, since the selection doesn't have to be in any particular time sequence, the results to an external observer appear highly random.

Referring now to FIG. 1 there is illustrated thereby a general block diagram of an MTI radar modified to include circuitry for carrying out the mode of operation described herein. FIG. 1 shows conventional components including antenna 3, transmit-receiver tube 4, pulsed r.f. source 5, pulse modulator 6, trigger generator 7, mixers 8, 10, IF amplifier 12, coherent oscillator 11 and the linear combiner circuit 13 of the present invention. All blocks represent standard state of the art radar components and functions. Pulse modulator 6, in accordance with the teachings of the invention effects pulse to pulse frequency agility in a manner common to that type of radar.

Figure 2:
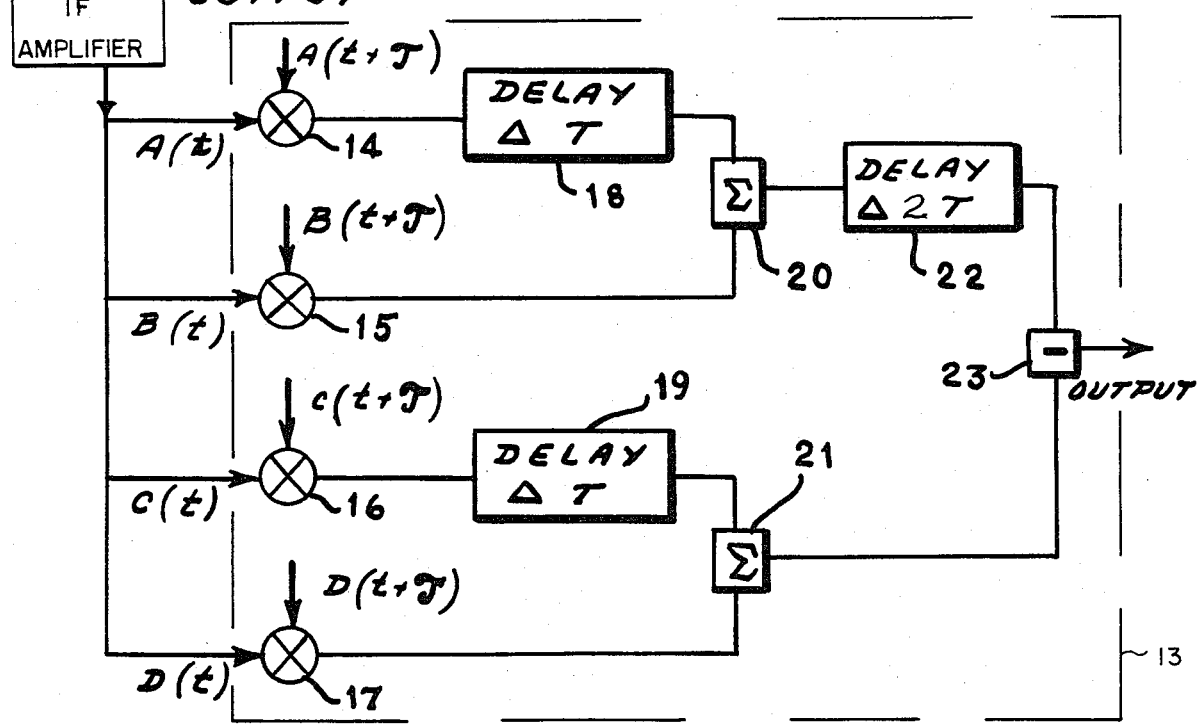
FIG. 2 is a schematic diagram of the linear combiner circuit of FIG. 1.

FIG. 2 illustrates schematically the linear combiner circuit 13 of FIG. 1. It comprises combiners 14-17, delay lines 18, 19, 22, summers 20, 21 and differencer 23.

In operation, the 4 pulses A(t), B(t), C(t) and D(t) are radar echo return pulses received in equal time intervals T at the four mixers 14-17 moving from top to bottom from the IF amplifier 12. Thus A(t) arrives first and D(t) last. In each case the arriving pulse is immediately mixed with one or more of the same oscillator signals, A(t+T), B(t+T), C(t+T) and D(t+T) from the coherent oscillator 11, delayed in time, by delay 110, that were initially used to create the transmitted signal. The resulting output is at an IF frequency suitable for either coherent storage for one interpulse period or for insertion into a linear combiner circuit (20,21) as shown. When two pulses are so combined, with a suitable offset between their IF frequencies into the linear combiner, the output will be a sinusoid whose amplitude varies as the difference frequency between the inputs. This difference frequency can be made the same for the combining of A(t) with B(t) as it is by combining C(t) and D(t). Therefore, if the relative phase of these two equal difference frequencies is also the same, as it will be for fixed targets, the resulting signal will cancel in the subtractor 23. Conversely, for moving targets, the relative phase of the two equal difference frequencies will not be the same and the subtractor will have a non-zero output.

While the invention has been described in its preferred embodiment it is understood that the words which have been used are words of description rather than words of limitation and that changes within the purview of the appended claims may be made without departing from the scope and spirit of the invention in its broader aspects.

What is claimed is:

1. The method of providing frequency agile operation of an MTI radar comprising the steps of:
    generating and transmitting a pulse train in which each pulse of each successive set of four pulses of said pulse train has a different frequency, the frequency of one pulse in said set of four pulses being related to the frequencies of the other three pulses such that the frequency difference between the first and second pulses is equal to the frequency difference between the third and fourth pulses, and;
    processing the received echo pulse train in successive sets of four pulses by:
    differencing the second pulse and the first pulse delayed a time increment $\Delta T$ to provide a first difference pulse signal,
    differencing the fourth pulse and the third pulse delayed a time increment $\Delta T$ to provide a second difference pulse signal, and
    differencing said second difference pulse signal and said first difference pulse signal delayed a time increment $2\Delta T$ to provide an MTI output.

2. The method of providing frequency agile operation of an MTI radar defined in claim 1 wherein processing of the received echo pulse train includes the steps of
    developing a reference pulse train,
    delaying said reference pulse train, and mixing pulses of said reference pulse train with corresponding pulses of said received echo pulse train.

3. A frequency agile MTI radar comprising r.f. pulse generating means for generating an r.f. pulse train, modulating means modulating the pulses of said r.f. pulse train to the effect that successive groups of four pulses taken as sets of pairs of pulses are frequency modulated such that the frequency of one of the pulses of the two pairs of pulses is constrained to make the pulse pairs have equal difference frequencies, transmitting means for transmitting said r.f. pulse train, receiving means for receiving a return r.f. pulse train echo, and processing means for processing the received r.f. pulse train echo to develop first and second difference frequency signal responsive to the frequency difference between the pulses of received pulse train echo pulse pairs, said processing means subsequently differencing said first and second difference frequency signals to provide an MTI output.

4. A frequency agile MTI radar as defined in claim 3 including means for providing a delayed reference r.f. pulse train, and wherein said processing means includes means for mixing the pulses of said delayed reference pulse train with corresponding pulses of said received r.f. pulse train echo.

5. A frequency agile MTI radar as defined in claim 4 wherein said processing means comprises first, second, third and fourth mixers said mixers receiving pulses of said reference r.f. pulse train and pulses of said received r.f. pulse train echo in order of arrival, a first delay means delaying the output of said first mixer, a second delay means delaying the output of said third mixer, a first summing means summing the output of said first delay means and the output of said second mixer, a second summing means summing the output of said second delay means and the output of said fourth mixer, a third delay means delaying the output of said first summing means, and a differencing means, differencing the output of said third delay means and the output of said second summing means.

6. A frequency agile MTI radar as defined in claim 5 wherein said first and second delay means have a delay of $\Delta T$ and said third delay means has a delay of $\Delta 2T$.

* * * * *